United States Patent [19]
Schott et al.

[11] 3,828,890

[45] Aug. 13, 1974

[54] CABLE LUBRICATING DEVICE

[76] Inventors: Roger A. Schott, 13559 Rutland, Detroit, Mich. 48227; Lawrence A. Schott, 15940 Warwick, Detroit, Mich. 48223

[22] Filed: Mar. 14, 1973

[21] Appl. No.: 341,168

[52] U.S. Cl............ 184/15 R, 118/405, 184/105 R
[51] Int. Cl............................................. F16n 7/00
[58] Field of Search.............. 184/15 R, 16, 105 R; 118/405, 404, DIG. 18, DIG. 19

[56] References Cited
UNITED STATES PATENTS

| | | | |
|---|---|---|---|
| 2,712,862 | 7/1955 | Pemberton...................... | 184/15 R |
| 3,101,812 | 8/1963 | Mercer, Sr...................... | 184/15 R |
| 3,283,854 | 11/1966 | Self................................ | 184/105 R |

FOREIGN PATENTS OR APPLICATIONS

| | | | |
|---|---|---|---|
| 257,790 | 9/1926 | Great Britain..................... | 184/15 R |
| 531,561 | 1/1941 | Great Britain..................... | 184/15 R |
| 617,909 | 2/1949 | Great Britain..................... | 184/15 R |
| 825,301 | 12/1959 | Great Britain..................... | 184/15 R |

*Primary Examiner*—Manuel A. Antonakas
*Attorney, Agent, or Firm*—Barnes, Kisselle, Raisch & Choate

[57] ABSTRACT

A lubricating fixture for sheathed slide cables which is readily attached and removed in a manner to seal one end of a sheath and the adjacent cable. The fixture has an opening for receiving lubricant under pressure wherein lubricant may be forced through the sheath around the cable to flush out foreign matter while supplying the necessary lubricant.

3 Claims, 5 Drawing Figures

PATENTED AUG 13 1974  3,828,890
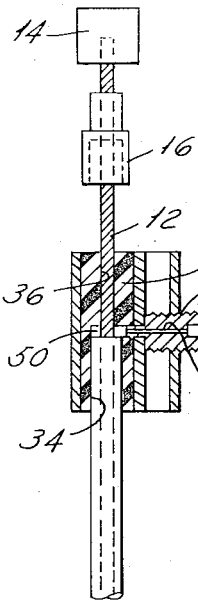
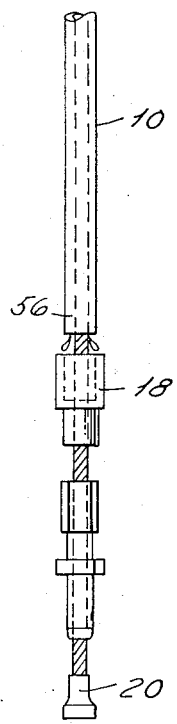
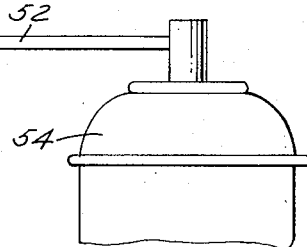
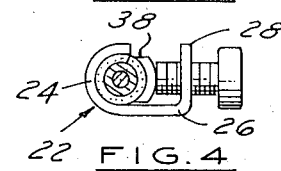
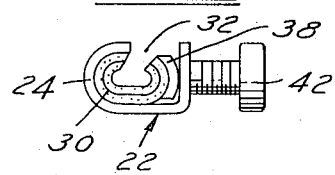
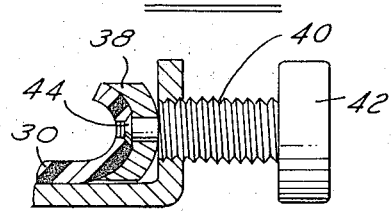

CABLE LUBRICATING DEVICE

This invention relates to a cable lubricating device and more particularly to a mechanism to facilitate the lubrication of sheathed slide cables.

Control cables are utilized on many mechanisms today and more particularly on vehicles where control cables are utilized for opening and closing heating vents, manipulating carburetor elements, operating brakes and clutches, and for numerous other functions.

The cables are generally sheathed so that they will be protected to some degree from the weather and also to impart the necessary stiffness to permit forces to be transmitted other than linearly. Because of the exposure to weather, dirt, salt, and other foreign matters, sometimes these cables become difficult to manipulate even to the extent of becoming frozen in the sheath.

It is an object of the present invention to provide a means for lubricating these cables which allows an operator to keep them in good working condition.

It is a further object to provide a simple lubricating fixture which can be applied either permanently or temporarily to cables to permit the introduction of lubricant under pressure to force it through the cable sheath to achieve the desired purpose.

It is a further object to provide a relatively simple and inexpensive fixture which can be sold at a reasonable price and which is adapted for use with presently available lubricating containers.

Other objects and features of the invention relating to details of construction and operation will be found in the following description and claims taken with the accompanying drawings in which there are disclosed the principles of operation of the invention and the best mode presently contemplated for the practice thereof.

DRAWINGS accompany the disclosure and the various views thereof may be briefly described as:

FIG. 1, an assembly view showing the manner in which the device is utilized.

FIG. 2, an outside view of the sealing clamp.

FIG. 3, an end view of the sealing clamp in closed position.

FIG. 4, an end view of the sealing clamp in open position.

FIG. 5, a partial sectional view illustrating the manner in which the clamp screw is associated.

REFERRING TO THE DRAWINGS

In FIG. 1, there is shown a sheath cable having a sheath 10 and a cable 12 with a control knob 14 and respective sealing end caps 16 and 18. The lower end of the cable, as viewed in FIG. 1, is constructed to be connected at 20 to a movable element to be remotely operated. The lubricating fixtures comprises a J-shaped element 22 having a bight portion 24 and a shank portion 26 with a flange 28 extending out over the bight portion. Seated within the bight of the J-shaped unit 22 is a C-shaped sealing element 30 which is normally open as shown in FIG. 4 to have a radial access entrance opening 32.

The element 30, as illustrated in FIG. 1, has a recess 34 which receives one end of the sheath 10 and a coaxial recess 36 which is ensmalled to fit a cable 12. The material of the elongated sealing member is preferably an oil resistant synthetic rubber or plastic material having a soft compressible consistency. In the particular clamping device shown, there is a pressure plate 38 which underlies the flange 28 and which is retained by the end of a clamp screw 40 having a head 42. The end of the screw is upset at 44 to retain the clamp plate 38.

The screw 40 has a central passage 46 which enlarges into an aperture 48 at the head portion. These passages lead to a recess 50 within the sealing member 30 and are so designed that a small plastic tube 52 of the type frequently furnished with a pressurized lubricant can 54 can be utilized so that pressure fluid may be introduced through passage 46 into the recess 50 and forced through the sheath 10 until it comes out the other end of the sheath at 56. Alternatively, the squirt tube 52 can be inserted into an opening 60 shown in FIG. 2 in the compressible element 30 to avoid the necessity of a central passage in the screw. In this instance a solid screw 62 would be used to actuate the clamping plate 38.

In some instances, it may be acceptable to have the lubricant fixture permanently attached to the sheath and cable; but in most cases there are space problems which make it more convenient to have the attachment temporarily placed on the end of the sheath and cable when it has been loosened to receive the same. The disclosed device is particularly adapted to easy application on removal. When the screw 42 is backed off, it will be seen that the sealing member 30 opens to provide the recess 32 which allows the insertion of the sheath and cable after which a screwing down of the clamp 38 seals the member around the sheath and the cable and allows the lubricant pressure to flow through the sheath.

What is claimed as new is:

1. A lubricating fixture for sheathed slide cables to be applied temporarily to assist in introducing a lubricant into the sheath around the cable which comprises:
    a. an elongate clamp housing having in cross section a semi-circular portion, a first wall portion extending from one side of said semi-circular portion, and a second wall portion extending at an angle to said first portion to face the interior of said semi-circular portion in spaced relation thereto,
    b. a flexible, soft sealing member disposed within said semi-circular portion having a c-shaped cross section open along its length to receive a sheath and cable, said member having an enlarged axial recess extending from one end a portion of its length to receive a sheath, and a smaller aligned recess extending the remainder of its length to receive a cable,
    c. a pressure plate lying inside said second wall portion to apply pressure to said member to force it into a closed tube,
    d. a screw threaded into said second wall to move said plate toward said semi-circular portion to seal said member around the end of a sheath and an enclosed cable, and
    e. means forming a passage to direct lubricant under pressure to the interior of said member wherein it will reach a sheath and cable enclosed therein.

2. A lubricating fixture as defined in claim 1 in which said screw passes through said plate and said member and said passage is formed in said screw for receiving lubricant under pressure.

3. A lubricating fixture as defined in claim 1 in which the said passage is formed in said member extending from the end containing said smaller aligned recess into the juncture between said aligned recesses.

* * * * *